Feb. 14, 1933.  R. W. THOMAS  1,897,170
WEIGHING MECHANISM
Filed Feb. 14, 1930  2 Sheets-Sheet 1

INVENTOR.
Rosswell W. Thomas

BY Lancaster, Allwine and Rommel
ATTORNEYS.

Feb. 14, 1933.    R. W. THOMAS    1,897,170
WEIGHING MECHANISM
Filed Feb. 14, 1930    2 Sheets-Sheet 2
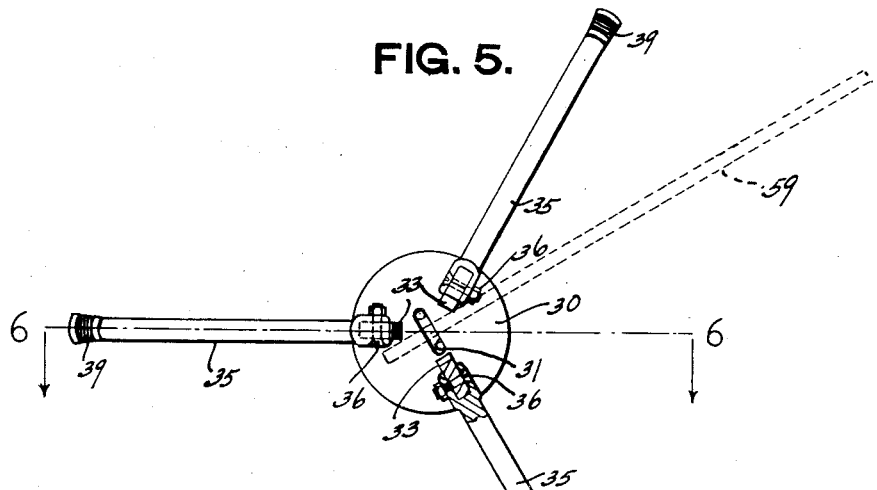
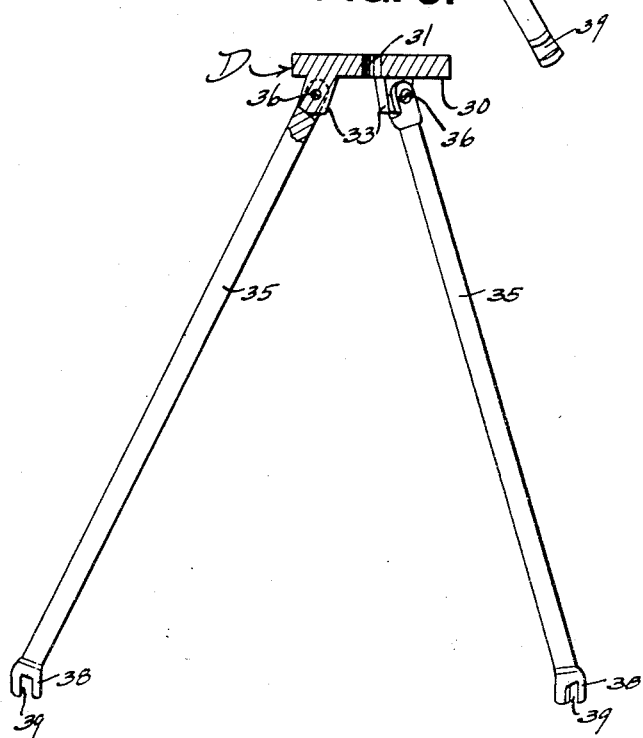
INVENTOR.
Rosswell W. Thomas
BY Lancaster, Allwine and Rommel
ATTORNEYS.

Patented Feb. 14, 1933

1,897,170

UNITED STATES PATENT OFFICE

ROSSWELL W. THOMAS, OF DETROIT, MICHIGAN, ASSIGNOR TO PHILLIPS PETROLEUM COMPANY, OF BARTLESVILLE, OKLAHOMA, A CORPORATION

WEIGHING MECHANISM

Application filed February 14, 1930. Serial No. 428,503.

This invention relates to improvements in apparatus for weighing any character of load, but particularly well adapted for the weighing of liquefied gas, in combination with apparatus such as set forth in a co-pending application of Paul S. Endacott, Serial No. 381,503, filed July 27, 1929.

The primary object of the invention is the provision of apparatus by means of which the weight of containers with liquefied gas therein may be readily ascertained in a facile and expeditious manner directly at a consumer's premises, from which it may be determined to what extent the consumer has used gas from the tank, and the need of replenishing the same.

A further object of this invention is the provision of an improved weighing device of the balance beam type having improved means associated therewith for supporting the same upon a stationary housing within which a load is movably mounted; improved means being provided in a cooperative relation with the frame and balance beam for lifting the load in a weighing relation.

Other objects and advantages of this invention will be apparent during the course of the following detailed description.

In the drawings, wherein for the purpose of illustration is shown only a preferred embodiment of the invention, Figure 1 is a view partly in elevation and partly in section, showing the improved weighing apparatus at the time of its initial attachment to a housing wherein a liquefied gas container is mounted, and showing the manner in which the weighing device may be initially adapted to the load.

Figure 5 is an enlarged bottom plan view, partly in section, of a collapsible tripod or frame structure used as part of the apparatus.

Figure 6 is a sectional view taken substantially on the line 6—6 of Figure 5.

Figure 1:
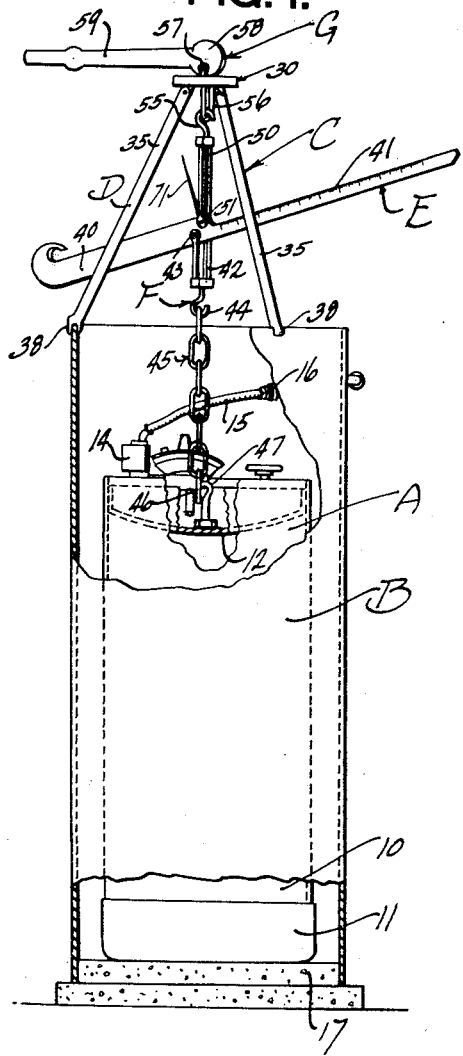
Figure 2:
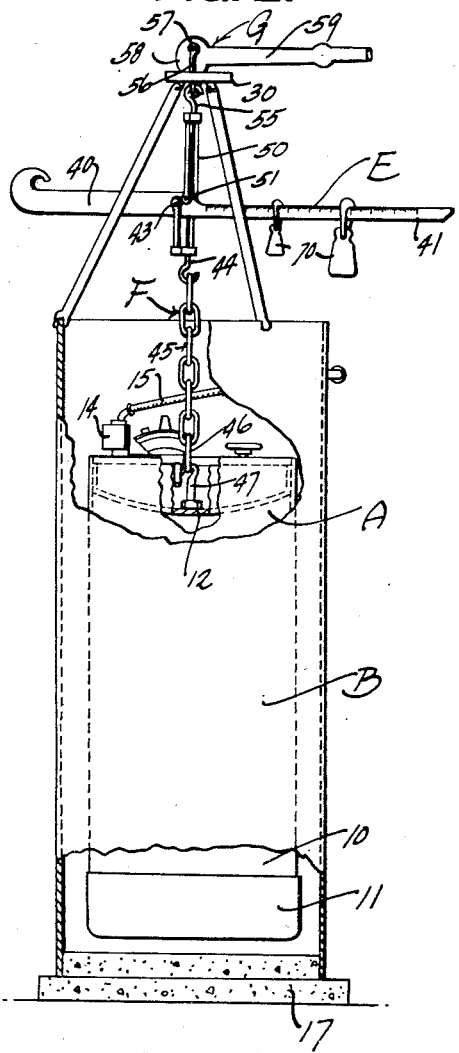
Figure 2 is a similar view, but showing the weighing apparatus in a weighing position with the liquefied gas container suspended therefrom.
Figure 3:
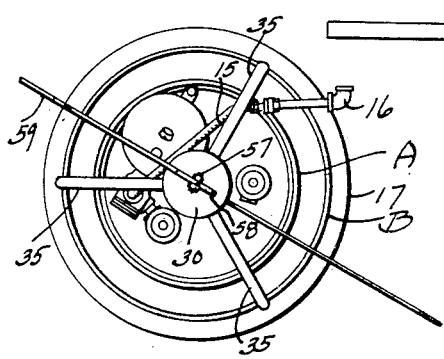
Figure 3 is a plan view according to Figure 1.
Figure 4:
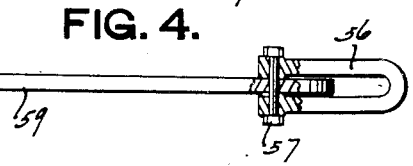
Figure 4 is an enlarged plan view of a lever and associated link by means of which the beam is operatively connected with a frame.

In the drawings, wherein similar reference characters designate corresponding parts throughout the several views, the letter A may generally designate a customer's tank or container which is adapted to receive liquid gas; the gas being under superatmospheric pressure, and the drum having service connections with a consumer's premises in a relation which will permit the container A to be bodily lifted vertically within a housing B which normally secretes the same. The weighing apparatus C may generally consist of a preferably collapsible frame D having a balance beam E provided with means F to connect the same to a load A in an operative relation; means G being provided for extensibly and operatively connecting the balance beam with the frame D and in a weighing relation with respect to the means F.

The drum A is preferably cylindrical in shape, comprising a cylindrical body 10 with an end or bottom 11 and a top end wall 12. The latter is provided with suitable connections for inlet and exit of the gaseous product, and it is also provided with a service outlet 14 having connection by means of a flexible conduit 15 with the service connection 16 leading into the consumer's premises. The drum A is of course positioned upright and rests within the housing B upon a suitable foundation 17. A suitable cover (not shown) may be provided for the housing B, preferably removable.

Referring to the weighing apparatus C, the tripod D thereof, sometimes hereinafter called a frame, may be of the collapsible or non-collapsible type. In the present instance it preferably comprises a platform or beam supporting member 30, in the form of a flat disc, which is circular in form, and preferably centrally provided with an elongated opening 31 therein in the form of a slot. This opening 31 is relatively long and narrow. The under-surface of the disc 30 is preferably provided with a plurality of extensions 33, preferably three in number, relatively diverging downward, altho not necessarily so. These lugs or extensions 33 are adapted to pivotally or otherwise movably receive legs 35 in a respective attachment therewith, so that the legs 35 may be extended or collapsed. The legs 35 are durably constructed and of the required length. They are bifurcated at their upper ends for receiving the lugs 33 therein; the bifurcated ends of said legs being appropriately pivoted to the respective lugs 33 by pins 36 which may be detachable if desired. The lower edges of the lugs 33 and the bottom of the slot at the bifurcated upper ends of the legs 35 may be suitably formed so that the bottoms of the last mentioned slots may engage against the lower edges of the respective lugs 33 therein, to limit the outward swinging of the leg 35, as shown in Figure 6, from which position the legs 35 may be moved into substantial parallel collapsed relation, as is quite apparent. The bottom ends of the legs 35 are preferably provided with attaching feet 38 having downwardly facing claws defining socket openings 39, each being arranged in acute angular relation with respect to the axis of the respective leg 35 upon which it is positioned. When the legs 35 are fully extended in scale supporting positon the sockets 39 face vertically downward and are adapted to receive therein the upper marginal portion of the housing B for supporting the frame or tripod D in extended position above the housing B, with the legs 35 braced at their upper ends against the respective lugs 33 with which they are connected for stably maintaining the supporting member or base 30 of the frame D in a central position above the axis of the housing B and drum A extended.

The balance beam E is of quite ordinary construction, having the hook end 40 and an opposite graduated end 41. Between its ends the means F is pivotally connected therewith, and consists of a U-shaped link 42 having parallel legs directly pivoted at 43 upon the beam E, and at its lower end having a hook 44 which detachably receives a link chain 45 of desired length, the lower link 46 of which is adapted to detachably connect upon an upstanding hook 47 fixedly connected centrally upon the drum A on the top wall 12 thereof, as shown in Figure 1 of the drawings. The chain 45 may be of a desired number of links, to adapt the weighing device to drums and housings of different sizes.

The beam E, between its ends, is also provided with an upstanding relatively long link 50, of inverted U-shaped formation, including relatively long legs which are pivoted at their lower ends at 51 upon the beam E on a pivot axis offset longitudinally with respect to the pivot 43 of the means F. The link 50 comprises part of the means G and at its upper end it has a hook 55 adapted to detachably connect in the bight end of a U-shaped link or connection 56, which is eccentrically pivoted at its upper end at 57 upon the cam disc or end 58 of an operating lever 59. The link 56 extends downwardly through the slot 31 of the tripod platform 30, and engages the hook 55 therebelow. The legs of the link 56 are of course relatively spaced so that they locate in the slot 31 in a manner to prevent any turning of the link therein. Of course, the disc cam 58 of the operating lever 59 is pivoted between the legs of the link 56, and this positions the cam 58 upon the top of the base or member 30 of the frame structure D in a plane transverse to the longitudinal axis of the slot 31. The peripheral edge of the cam 58 is convex, and of course the pivot 57 of the link 56 is eccentric thereon, so that upon swinging the lever 59 the connection between the cam 58 and the beam E will be elevated and lowered for elevating and lowering not only the beam E but the means F, as will be quite apparent.

Referring to the operation of the device, the frame D is extended and detachably placed upon the housing B in a relation shown in Figure 1. The lever 59 is swung to lower the link 50 and the beam E so far as possible, in the position shown in Figure 1, and in this position the lowermost link 46 of the means F has been lowered so that said link 46 may be slipped beneath the bill of the hook 47. The lever 59 is then swung across the top of the tripod, and the cam throw edge of the disc 58 operating on the platform 30 will cause the connection between the cam and the drum A to tighten and be elevated, and when the lever 59 is swung to a diametrically opposite position to place the pivot connection 57 upon the cam past the dead center line established by the connection between the said cam and the load A, the load A will have been slightly lifted by this operation from its foundation 17 independent of the fact as to whether the beam is in weighing position or not. Of course this operation will tend to vertically align the pivot points 43 and 51 of the connections upon the beam E, but still the throw of the cam is sufficient to elevate the load A independent of whether weights are upon the beam E or not. Thereafter the operator places the weights 70 upon the graduated ends of the beam E and adjusts them until the beam is in balanced relation. The balanced relation is determined by a pointer 71 rigid upon the beam E which must vertically align between the legs of the link 50, in order to indicate that the beam is balanced. The combined weight of the drum A and its contents having been determined, the operator can readily ascertain the net contents in order to charge the purchaser for that part which has been consumed.

In order to establish connection of the link 46 with the hook 47 it may sometimes be necessary to press down upon the hook end 40 of the beam E to additionally lower the link 46, in a relation which is quite apparent from Figure 1.

The weighing operation having been accomplished, the operator need only press down upon the hook end of the beam, to effect lowering of the load A and at the same time or prior thereto swing the lever 59 to additionally lower the load, and the link 46 may be disconnected from the hook 47. The tripod legs may then be collapsed and the weighing apparatus placed in a compact relation upon the operator's truck.

Various changes in the shape, size, and arrangement of parts may be made to the form of invention herein shown and described, without departing from the spirit of the invention or the scope of the claims.

I claim:

1. In weighing apparatus, the combination of a frame including a platform having an elongate slot therein open to the top and bottom of the platform, a load supporting and weighing device including a link having spaced legs extending thru said slot, and a cam above said platform engaging at the longitudinal marginal portions of the slot and to which said legs of the link are operatively connected for raising and lowering of the load supporting and weighing device by movement of the cam.

2. In weighing mechanism of the class described, the combination with a customer's tank, a housing for receiving the customer's tank in a vertically movable relation therein, and a service connection to the tank which will permit the tank to be elevated in the housing without disconnecting flow of gas therefrom to the service connection, of a portable frame including a platform and legs pivotally connected to and extending beneath said platform and with their lower end portions formed for detachably engaging the upper marginal portion of said housing, and a load lifting, supporting and weighing device carried by said platform and extending beneath the upper marginal portion of said housing and adapted to be detachably connected to said tank for weighing the tank and its contents while in said housing.

ROSSWELL W. THOMAS.